Sept. 29, 1970  D. F. ROHRER  3,531,083
BUTTERFLY VALVE DISK WITH MECHANICAL MEANS FOR
EXPANDING A PERIPHERAL SEALING RING
Filed Feb. 19, 1968
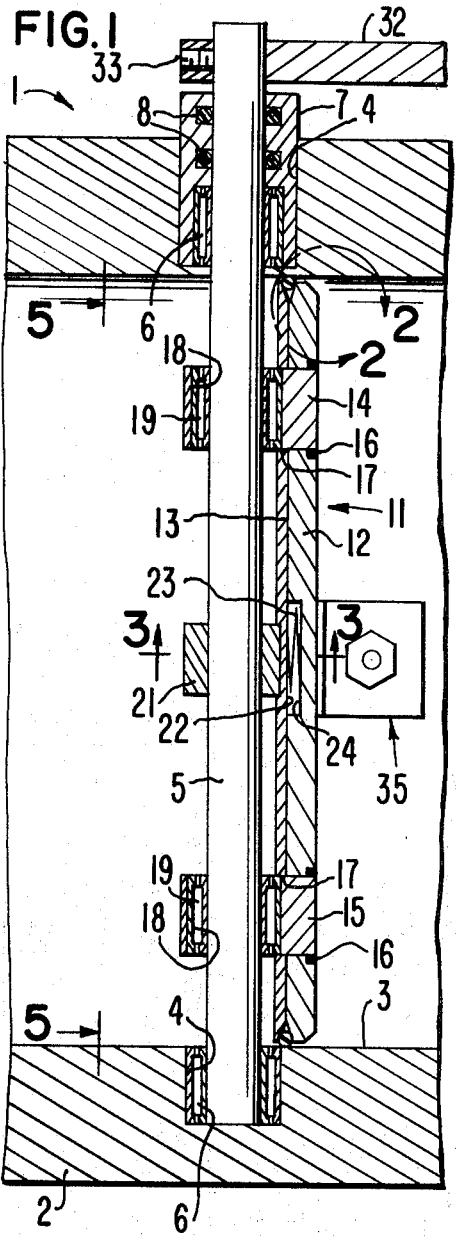
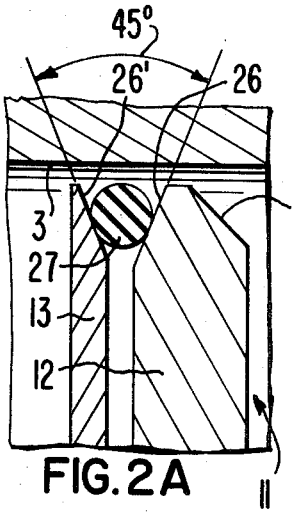
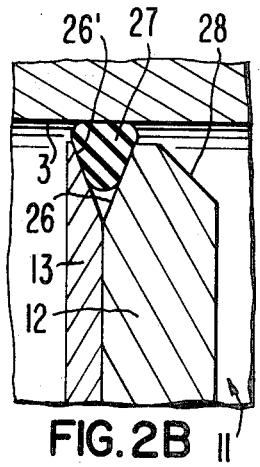
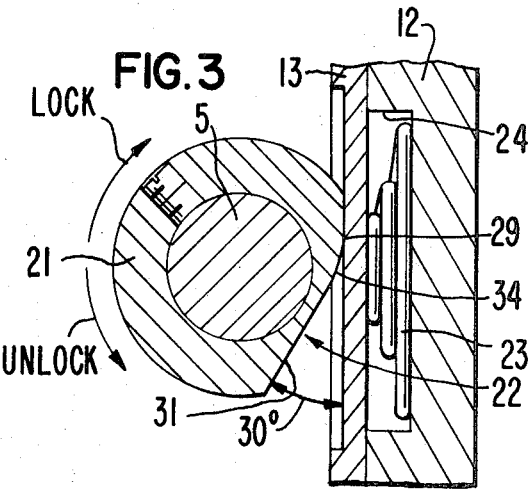
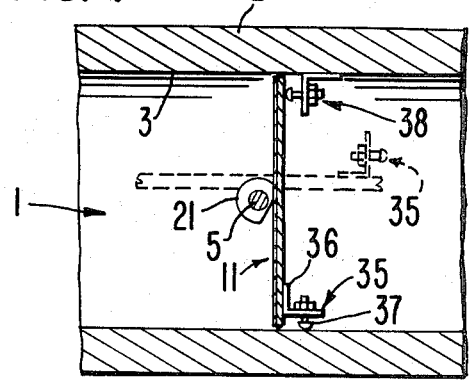
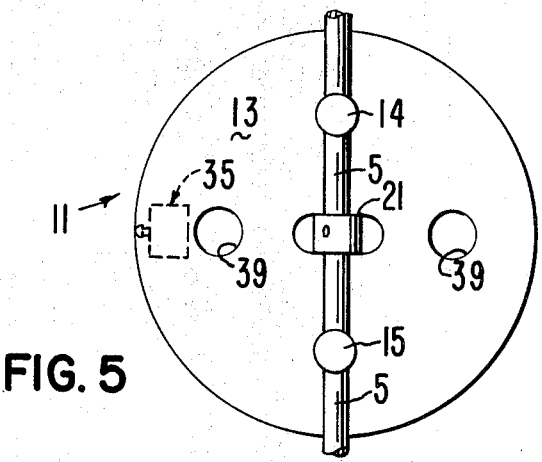
INVENTOR.
DANIEL F. ROHRER
BY
Leon F. Herbert
ATTORNEY

United States Patent Office 3,531,083
Patented Sept. 29, 1970

3,531,083
BUTTERFLY VALVE DISK WITH MECHANICAL MEANS FOR EXPANDING A PERIPHERAL SEALING RING
Daniel F. Rohrer, Hillsboro, Oreg., assignor to Varian Associates, Palo Alto, Calif., a corporation of California
Filed Feb. 19, 1968, Ser. No. 706,493
Int. Cl. F16k 5/14
U.S. Cl. 251—188                                7 Claims

ABSTRACT OF THE DISCLOSURE

A butterfly valve assembly is disclosed which includes a valve housing having a bore therein to define a fluid passageway to be valved. A valve disk structure is pivotably supported in the fluid passageway on a valve stem which extends through the side wall of the housing to the outside for rotation. The valve disk structure includes a pair of axially spaced disk-shaped plates. The two plates are spring biased apart and one of the disks, at its outer periphery, includes an outwardly flared conical surface on which a sealing ring is disposed to seal the valve, a cam carried on the valve stem is operated against the spring bias force and causes the disks to be squeezed together to expand the inner diameter of the sealing ring by forcing such ring along the outwardly flared surface against the inner wall of the fluid passageway to form a fluid seal between the fluid passageway and the valve disk structure. To open the valve, the valve stem is rotated, causing the cam to release the squeezing pressure on the pair of valve disks and permitting the resilient sealing ring to contract and release the sealing engagement between the valve disk and the fluid passageway, thereby permitting rotation of the valve disk with the stem.

DESCRIPTION OF THE PRIOR ART

Heretofore, a butterfly valve disk has included a peripheral recess for containing a resilient sealing ring for sealing the valve disk to the inner wall of the fluid passageway. Such a prior art butterfly valve assembly is disclosed in U. S. Pat. 2,657,896, issued Nov. 3, 1953. The problem with this type of prior art butterfly valve assembly is that, for a large valve structure, i.e., in excess of 3" in diameter, the scrubbing action of the inside wall of the fluid passageway on the resilient sealing ring tends to be excessive with opening and closing of the valve. This scrubbing action on the sealing ring causes the ring to distort and to wear excessively, thereby permitting leaks to develop.

Therefore, it is desirable to obtain a butterfly valve assembly wherein the butterfly valve disk may be sealed in a fluidtight manner to the interior wall of the fluid passageway without producing an excessive scrubbing action between the sealing ring and the interior wall of the fluid passageway.

SUMMARY OF THE PRESENT INVENTION

The principal object of the present invention is the provision of an improved butterfly valve disk of the type employing a peripheral sealing ring and valve assemblies using same.

One feature of the present invention is the provision in a butterfly valve disk structure of means for selectively expanding the inner diameter of a resilient sealing ring disposed about the periphery of the valve disk to cause the sealing ring to expand into sealing engagement with both the inside wall of the fluid passageway and the periphery of the valve disk for fluid sealing the valve disk to the fluid passageway, whereby a compression seal is obtained without a scrubbing action between the sealing ring and the inside wall of the fluid passageway.

Another feature of the present invention is the same as the preceding feature wherein the means for expanding the diameter of the resilient sealing ring includes an outwardly flared sealing surface at the outer periphery of the valve disk structure and means for selectively pushing the sealing ring over the flared sealing surface toward the widest end thereof to cause the sealing ring to ride outwardly on the flared surface to produce sealing engagement of the ring with the interior wall of the fluid passageway and with the flared surface of the valve disk structure, thereby sealing same.

Another feature of the present invention is the same as the preceding feature wherein, the valve disk structure includes first and second axially spaced disks with a cam structure carried upon the valve stem for selectively squeezing the first and second valve disks together to cause the resilient sealing ring to be squeezed outwardly over the flared surface of one of the sealing disks.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view of a butterfly valve incorporating features of the present invention, FIGS. 2A and 2B are enlarged detailed views of a portion of the structure of FIG. 1 delineated by line 2—2 and depicting a valve disk structure in the unsealed and sealed positions, respectively, FIG. 3 is an enlarged sectional view of a portion of the structure of FIG. 1 taken along line 3—3 in the direction of the arrows, FIG. 4 is a schematic longitudinal sectional view of the butterfly valve apparatus of the present invention depicting operation of the position stop mechanism, and FIG. 5 is a reduced view of a portion of the structure of FIG. 1 taken along lines 5—5 in the direction of the arrows.

DESCRIPTION OF THE PREFERRED EMBODIMENTS

Referring now to FIG. 1, there is shown a butterfly valve 1 of the present invention. The valve 1 includes a valve housing 2 having a cylindrical bore 3 therein defining a fluid passageway which is to be valved. A transverse bore 4 passes through one wall of the housing 2 and diametrically intersects with the longitudinal bore 3 to accommodate a valve stem 5. The valve stem 5 is supported within the transverse bore 4 via the intermediary of a pair of roller bearings 6, disposed at opposite ends of the valve stem, and a bushing 7 containing a pair of axially spaced O-rings 8 for sealing the stem 5 to the housing 2.

A valve disk structure 11 is pivotably supported within the fluid passageway 3 on the valve stem 5. More particularly, the valve disk structure 11 includes a pair of valve disk plates 12 and 13. Valve disk plate 12 is furtherest removed from the valve stem and includes two guide posts 14 and 15, welded at 16 to the valve plate 12 and extending through aligned apertures 17 in the second valve disk plate 13. The guide posts 14 and 15 are disposed on a diameter of the valve disk structure 11 and each guide post 14 and 15 includes a transverse bore 18 axially aligned with a diameter of the valve disk structure 11 to receive the valve stem 5 therethrough. Roller bearings 19 are disposed in the bores 18 to permit rotation of the valve stem 5 relative to the guide posts 14 and 15.

An eccentric cam 21 (see FIGS. 1 and 3) is fixedly secured to the valve stem 5 at substantially its midpoint with a cam surface 22 of the cam 21 bearing in slidable engagement against a central recess in the second valve disk plate 13. A conical spring 23 is disposed in a recess 24 in the first valve disk plate 12 with the spring being disposed between the two valve disk plates 12 and 13 for spring biasing the valve disks 12 and 13 apart in the axial direction. The spring bias force works against the cam surface 22.

The outer peripheral surfaces of the valve disk plates 12 and 13 (see FIGS. 1, 2A and 2B) are provided with outwardly flared conically bevelled surfaces 26 and 26', the conically flared surfaces 26 making an angle of 22.5° with the plane of the disk 12 and 13 and providing an included angle of 45° between the surfaces 26 and 26'. The bevelled portions of the disks 12 and 13 define a peripheral recess to receive a resilient O-type sealing ring 27, which extends completely around the outer periphery of the valve disk structure 11. The front peripheral surface of the valve disk plate 12 includes a chamfer at 28 to facilitate obtaining sufficient clearance for rotation of the valve disk structure 11 into the closed position.

Referring now to FIGS. 2A, 2B and 3, operation of the butterfly valve is more fully described. In FIG. 3 the action of the cam 21 is depicted. More specifically, the cam 21 includes two flat cam surfaces 29 and 31, respectively. The radial distance from the center of the valve stem 5 to the plane of the cam surface 29, which is shown riding against the valve disk plate 13, is greater than the radial distance from the center of the stem 5 to the other cam surface 31. The angle between the two cam surfaces 29 and 31 is approximately 30°. When the cam is rotated in the direction indicated by the arrow as "lock," i.e., the clockwise direction in FIG. 3, the two valve disk plates 12 and 13 are caused to be squeezed together by the cam action overcoming the spring bias force of spring 23 which tends to push the two disk plates 12 and 13 apart. When the two disk plates 12 and 13 are squeezed together as shown in FIG. 3 the inner diameter of the sealing O-ring 27 is expanded by the ring being pushed up the incline surfaces 26 and 26' at the periphery of the disk plates 12 and 13, causing the O-ring 27 to be moved from the position as indicated in FIG. 2A to the final position as indicated in FIG. 2B. In the final or "locked" position, as indicated in FIG. 2B, the sealing ring 27 has been forced radially outwardly into sealing engagement with the inner wall of the bore 3 and with the inclined surfaces 26 and 26' of the disk plates 12 and 13, thereby forming a fluidtight seal between the valve disk structure 11 and the inside surface of the bore, thereby fluid sealing the fluid passageway 3.

When it is desired to open the valve, the valve stem 5 is rotated in the counterclockwise direction, indicated by the arrow marked "unlock" in FIG. 3, as by a suitable handle or lever 32 (see FIG. 1) fixed to the outer end of the valve stem 5 as by a set screw 33. As the valve stem 5 and cam 21 are rotated in the counterclockwise direction, the expanded O-ring 27 provides a sufficient frictional lock for the valve disk structure 11 to prevent rotation of the valve disk with the valve stem 5. Thus, the cam 21 rotates relative to the surface of the valve disk 13 such that the second cam surface 31 is brought into flat bearing engagement with the surface of disk 13. In this position the bias spring 23 axially separates disk plates 12 and 13, as shown in FIG. 2A, letting the sealing ring 27 contract and move down the inclined surfaces 26 and 26' out of sealing engagement with the inside surface of the bore 3, thereby unlocking and unsealing the valve disk structure 11 and permitting the valve disk structure 11 to rotate with the valve stem 5 and cam 21.

Although in a preferred embodiment of the present invention, both peripheral surfaces of disks 12 and 13 are bevelled, this is not a requirement. Alternatively, only one of the peripheral surfaces of the disk plates 12 and 13 need be bevelled. In this latter case, the angle of bevel is preferably 45° to the plane of the disk 12 and 13, rather than 22.5°. The fluid seal is made by squeezing the plates 12 and 13 together, thereby causing the unbevelled plate to push or squeeze the O-ring 27 up the inclined bevelled surface of the other plate into sealing engagement with the interior surface of the fluid passageway 3.

Use of two 22.5° bevels 26 and 26' is preferred over use of a single 45° bevel because the two bevels permit the O-ring to be located, when the valve is open, closer to the valve stem 5. Thus, in the open position, the O-ring 27 can be closer to the same diameter as that of the fluid passageway and still not scrub the inside wall of the bore 3. Therefore, in closing of the valve, the O-ring 27 does not have to be expanded as much to make the seal and, in addition, this permits more compression of the O-ring 27 with the same amount of axial squeezing movement of the valve disks 12 and 13.

The butterfly valve 1 of the present invention is especially useful for valving the vacuum conduit between a system being evacuated and a high vacuum pump in a relatively large system requiring relatively high pumping speeds, such as speeds in excess of thousands of liters per second. In such cases, the vacuum conduits must be relatively large in order to provide the high pumping speeds.

One special feature of the butterfly valve 1, in addition to its excellent leak-tight sealing qualities, is that it permits obtaining a controlled leak by rotating the cam 21 to a position generally indicated by 34 on the cam, which just cracks open the space between the valve disk plates 12 and 13, thereby removing some of the sealing pressure applied to the sealing ring 27. This slight cracking of the valve permits a controlled leak rate past the valve disk 11, which is desirable under certain operating conditions in vacuum systems.

Referring now to FIGS. 1 and 4, a positional stop structure generally indicated at 35 in FIG. 1 is more fully described. The positional stop structure comprises a right angle bracket 36 fixed to the disk plate 12, as by spot welding. A screw is threaded into a tapped bore in the outwardly extending portion of the bracket 36 and a lockout is affixed over the end of the screw for locking it in a position of proper adjustment. The screw 37 is adjusted such that as the valve disk 11 is rotated in the clockwise direction as viewed in FIG. 4, i.e., in the lock direction, the screw 37 will engage the inside wall of the bore 3 when the valve disk structure 11 is exactly in the desired perpendicular plane for sealing or closing the flow of fluid through the fluid passageway 3. When rotation of the disk structure 11 is stopped by the stop structure 35, the cam 21 may then rotate into the lock position, wherein cam surface 29 bears against the plate 13, as previously described. As an alternative to the positional stop structure 35, which is carried on the valve disk structure 11, the stop structure may be carried from the inside surface of the bore 3 as generally indicated at 38. The stop structure 38 may comprise a suitable bracket and screw structure similar to that generally indicated at 35.

Referring now to FIG. 5, there is shown a view of the valve disk structure 11, taken along line 5—5 in the direction of the arrows in FIG. 1. The disk plate 13 includes a pair of apertures 39 to facilitate evacuation of the spaces in between the disk plates 12 and 13.

As previously discussed, the butterfly valve 1 of the present invention is especially useful for valving the flow of gases in vacuum systems operating to very low pressures such as $10^{-9}$ torr. The squeezing action of the valve disk structure 11 permits essentially a pure compression type of seal to be obtained between the sealing ring 27 and the interior surface of the fluid passageway 3, thus avoiding the prior scrubbing action obtained with prior valve disk structures which employed a peripheral sealing ring.

In a typical valve of the present invention utilizing a 5.188" diameter fluid passageway 3, a 5.125" outside diameter rubber O-ring 27 was employed for sealing the valve disk structure 11. The O-ring had a cross-sectional diameter of 0.125″. The valve 1 in the closed position exhibited a leak rate on the order of $1 \times 10^{-11}$ cc. of helium per second.

When the valve 1 is to be used in a vacuum system, the metallic parts of the valve structure are preferably made of nonmagnetic stainless steel. In order to prevent galling of the sliding surfaces in the valve they are preferably lubricated with a suitable lubricant for use in vacuum systems. It has been found that if the sliding surfaces are lubricated with molybdenum disulphide in the form of a film which is sprayed and baked on, suitable high vacuum lubrication properties are obtained.

What is claimed is:

1. In a butterfly valve assembly, for providing a leak-tight high vacuum seal a valve housing having a bore therein to define a gas passageway to be valved, a valve disk structure pivotably supported in said passageway for valving the flow gases through said passageway, said valve disk structure having a peripheral recess extending around the entire periphery of said disk structure, a resilient sealing ring disposed in said recess and extending completely around the periphery of said valve disk for sealing said disk structure to the interior wall of said gas passageway when the valve disk is in the closed position, said valve disk structure including means for selectively moving a peripheral portion of said valve structure which defines a portion of said recess to expand the inner diameter of said sealing ring and force said ring radially outward and cause said sealing ring to bear in gas sealing engagement with both the inside wall of said gas passageway and said peripheral portion of said valve disk for vacuum sealing said valve disk to said gas passageway.

2. The apparatus of claim 1, wherein said peripheral portion of said valve structure defining said recess includes, an outwardly flared conical sealing surface at the outer periphery of said valve disk structure with the axis of revolution of said flared surface being coaxial with the longitudinal axis of the gas passageway in the closed position of the valve, said sealing ring being disposed coaxially with and on said flared sealing surface, means for selectively pushing the full sealing ring in the axial direction of said flared sealing surface toward the outer end thereof to cause said sealing ring to ride outwardly on said flared surface in sealing engagement therewith and into sealing engagement with the interior wall surface of said gas passageway, thereby sealing said valve disk structure to said gas passageway.

3. The apparatus of claim 2, wherein said valve disk structure includes first and second axially spaced disks, said first disk having said flared surface formed at its periphery, said second disk forming said means for pushing said sealing ring over said flared surface and defining with said flared surface the peripheral recess containing said sealing ring, spring bias means for biasing said first and second disks apart in the axial direction a valve stem extending through the side wall of said housing and being affixed to said valve disk structure for pivoting said valve disk, said valve stem having a cam affixed thereto bearing against one of said first and second valve disks for operating against said spring bias force to selectively move one of said first and second disks toward the other to cause the inner diameter of said sealing ring to be expanded to force said ring into sealing engagement with the interior wall of said gas passageway.

4. The apparatus of claim 3 including a pair of axially directed guide posts fixedly secured to one of said first and second disks and extending axially through aligned apertures in the other one of said disks, said guide posts each having a bore therethrough to receive said valve stem therethrough in bearing engagement to capture said first and second disks on said valve stem, said spring bias means serving to bias said aperture disk against said cam on said valve stem.

5. The apparatus of claim 4 including a position stop structure carried by said valve disk structure for engaging the interior wall of said gas passageway to prevent further rotation of said valve disk structure in the closing direction when said valve disk structure reaches the closed position, and said cam operating by further rotation of said valve stem in the valve closing direction to squeeze said first and second disks together against said spring bias force to expand the inner diameter of said sealing ring and force the same into said sealing engagement.

6. The apparatus of claim 5, wherein said cam has two flat cam surfaces, one of said cam surfaces producing a predetermined squeezing action on said first and second disks to cause said disks to expand the inner diameter of said sealing ring and produce the gas tight seal, and said other cam surface allowing the spring bias force to move said first and second disks apart sufficiently to permit said sealing ring to move inwardly on said outwardly flared peripheral surface of said disk structure to unseal said valve disk structure.

7. The apparatus of claim 3 wherein said second disk includes an outwardly flared surface at its periphery defining said peripheral recess with said first flared surface on said first disk, said sealing ring riding on both flared surfaces such that when said first and second disks are moved together the flared surfaces move together to expand the inner diameter of said sealing ring and force same outwardly into sealing engagement with the interior surface of said gas passageway.

References Cited
UNITED STATES PATENTS

| | | | |
|---|---|---|---|
| 433,060 | 7/1890 | Zehren | 251—158 |
| 1,669,119 | 5/1928 | Bliss | 251—158 |
| 2,946,553 | 7/1960 | Adam | 251—188 |
| 2,853,267 | 9/1958 | Herren | 251—175 |

CLARENCE R. GORDON, Primary Examiner

U.S. Cl. X.R.

251—163, 285, 287, 307, 308